United States Patent
Röttig

[11] 3,874,323
[45] Apr. 1, 1975

[54] GAUGE FOR LIQUID, LOW-COOLED PRESSURE GASES

[75] Inventor: Hans Röttig, Kaarst, Germany

[73] Assignee: Messer Griesheim GmbH, Frankfurt/Main, Germany

[22] Filed: Feb. 15, 1974

[21] Appl. No.: 442,805

[30] Foreign Application Priority Data
Mar. 9, 1973  Germany............................. 7308975

[52] U.S. Cl.................. 116/117 R, 62/125, 73/326
[51] Int. Cl......................... G01f 15/04, G01f 15/06
[58] Field of Search.................. 116/117 R; 62/125; 73/323–333, 209

[56] References Cited
UNITED STATES PATENTS

| | | |
|---|---|---|
| 2,333,884 | 11/1943 | Porter.................................. 73/209 |
| 2,550,175 | 4/1951 | Van Ham........................... 73/325 X |
| 2,629,262 | 2/1953 | Vilter.................................... 73/326 |
| 3,053,084 | 9/1962 | Doane................................... 73/209 |
| 3,323,484 | 6/1967 | Minkin et al..................... 116/117 R |

Primary Examiner—S. Clement Swisher
Assistant Examiner—Daniel M. Yasich
Attorney, Agent, or Firm—Connolly and Hutz

[57] ABSTRACT

A gauge or detector for low-boiling, liquefied gases is characterized by a transparent tube through which the liquefied gas passes with a vacuum-tight chamber surrounding the tube. The chamber has two sight openings or observation windows for observing the nature of the liquefied gas.

8 Claims, 3 Drawing Figures

GAUGE FOR LIQUID, LOW-COOLED PRESSURE GASES

BACKGROUND OF THE INVENTION

The invention relates to a gauge glass for liquid, low-cooled pressure gases, which makes it possible to observe such gases. Above all, when liquid gases are drawn off, it is required to visually establish in the direct vicinity of the discharge pipe, whether the drawn off gas is completely liquid or is to a certain extent in the gaseous state. Such a possibility of examination has not existed up to now.

Therefore, the problem of the invention is to create a gauge glass for liquid, low-cooled pressure gases, which allows such an observation possibility.

SUMMARY OF THE INVENTION

A gauge glass for liquid, low-cooled pressure gases has now been found, which consists, according to the invention, of a transparent glass tube, being passed through by liquefied gas and surrounded by a vacuum-tight chamber, which comprises two sight-openings for observation of the liquefied gas passing through the glass tube. It is advantageous for the sight-openings to be placed opposite of each other and arranged at the height or level of the glass tube, being passed through by the liquefied gas.

THE DRAWINGS

DETAILED DESCRIPTION

The inventive gauge in general includes a transparent tube for conveying the liquefied gas with a vacuum-tight jacket therearound provided with observation windows or sight-openings to view the condition of the liquefied gas flowing through the tube.

Figure 1:
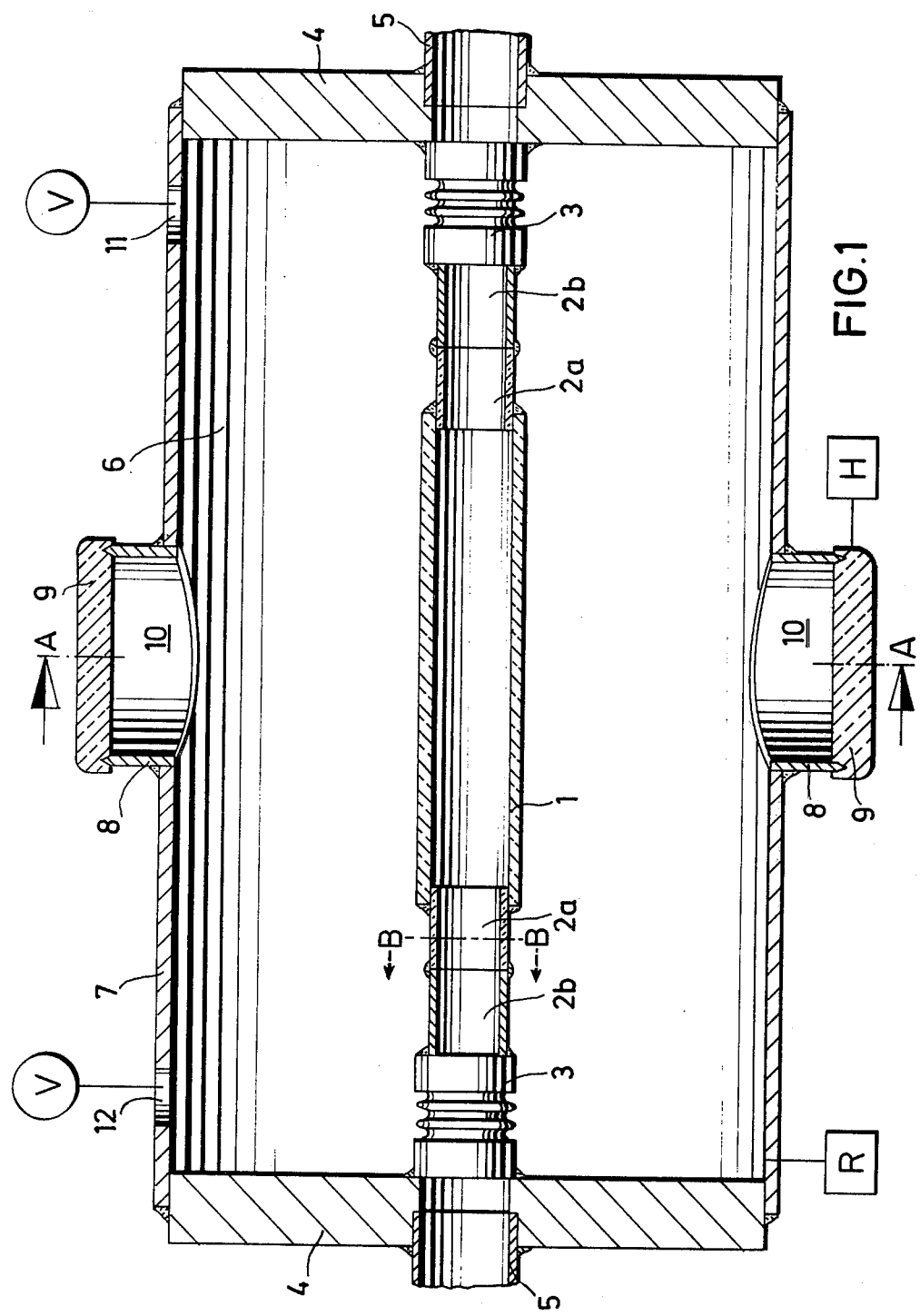
FIG. 1 is a cross-sectional view of a gauge glass in accordance with this invention.

For the observation of liquid, low-cooled pressure gases, the vacuum-tight chamber is evacuated, suitably to a vacuum below $10^{-5}$ Torr. When the liquid, low-cooled gas passes through, neither the outside wall of the glass tube, nor the inner sides of the sight-openings can be covered with ice, since there is a vacuum in the intermediate space, so that it is not possible for the air to go below the thaw point. By the walls of the vacuum-tight chamber being as thin as possible, the conduction of heat is kept low. If one desires to observe the low-cooled liquid for a very long time, the temperature of the two sight-openings drops below the thaw point by heat conduction in the walls of the vacuum-tight chamber, through which the glasses of the sight-openings become covered with moisture and ice. In this case, the vacuum-tight chamber or at least its sight-openings must be heated. This may be accomplished in any suitable manner such as schematically illustrated at H in FIG. 1. However, it is not absolutely necessary to produce a vacuum in the vacuum-tight chamber. The observation of the liquid, low-cooled pressure gases can also be carried out by rinsing the chamber with a dry, low-boiling gas, e.g., nitrogen. Then, from the rinsing gas neither water can condense out, nor can the rinsing gas condense at the cold glass tube. FIG. 1 also schematically illustrates the provision of suitable rinsing means R. The rinsing means likewise may be accomplished through valves V, V.

Figure 2:
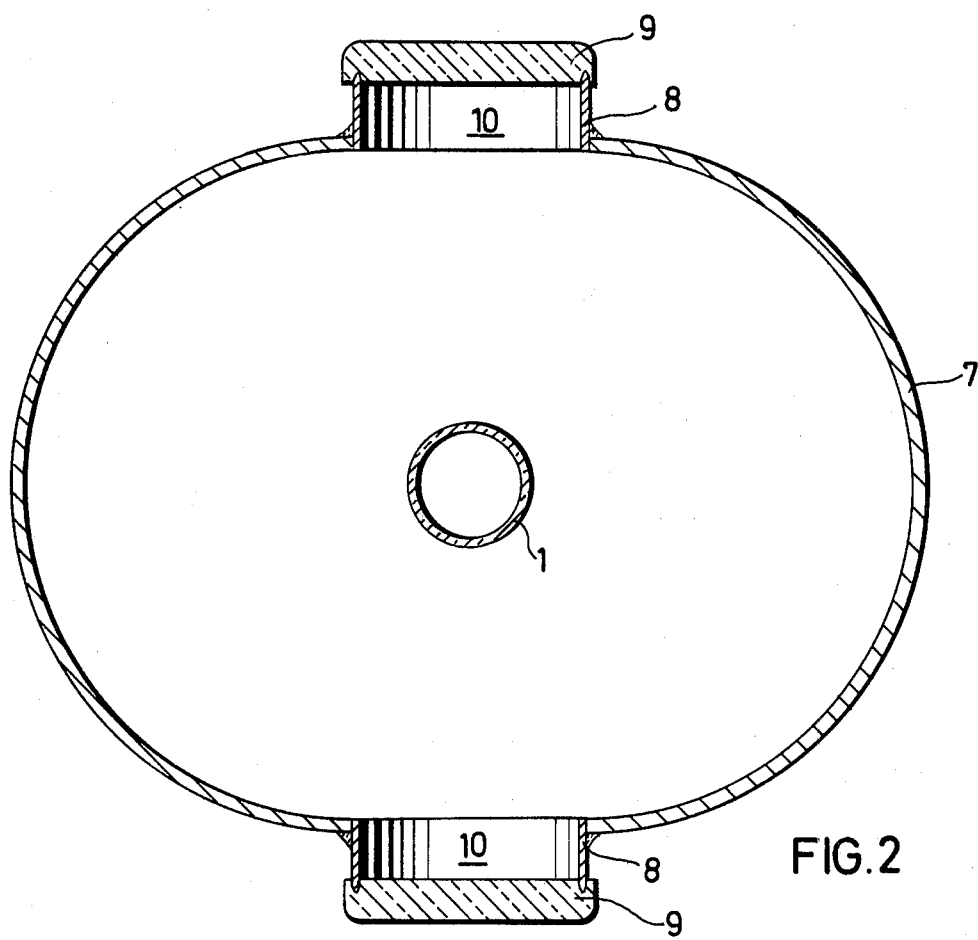
FIG. 2 is a cross-sectional view taken through FIG. 1 along the line A—A.

The gauge shown in FIGS. 1 and 2, consists of a transparent glass tube 1, being resistant to pressure up to a maximum of, for example, 30 atmospheres of excess pressure. The Jean glass "Duran 50" e.g., is suitable for this purpose. The glass tube 1 is connected at each end by means of a transition piece with metal compensators 3. The transition piece consists of a transition glass 2a and of a metal cylinder 2b, which is made of the material known under the name of Vacon (R).

Figure 3:
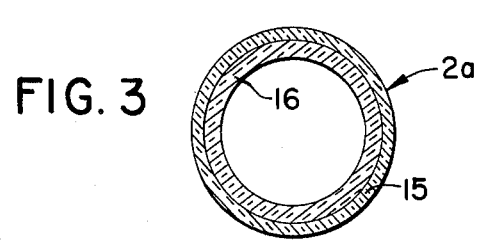
FIG. 3 is a cross-sectional view taken through FIG. 1 along the line B—B.

The transition glass 2a consists of several layers of glass, which stick in each other, like the hollow stems of the plants of the genus Equisetum, and make possible a vacuumtight connection with glass as well as with metal. FIG. 3 illustrates two such layers 15, 16.

The metal compensators 3 have the task to equalize the longitudinal changes of the apparatus, when it is passed through by liquid, low-cooled pressure gases. The metal compensators 3 are welded to walls 4, which form a part of the vacuum-tight chamber 6. Copper pipes 5 are soldered into the walls 4, through which pipes the low-cooled, liquefied gas is fed in and discharged. A thin-walled pipe 7 is welded to the walls, so that the vacuum-tight chamber is formed by the walls 4 and the pipe 7. In pipe 7 two sight-openings 10, opposing each other, are inserted, namely at the height or level of pipe 1. The sight opening 10 consists of a metal cylinder 8 of Vacon (R), on which a glass plate 9 of the Jena glass "Duran 50" is provided vacuum-tight.

In the thin-walled pipe 7 two additional openings 11 and 12 are provided, in which a vacuum-shutting-valve and an excess-pressure valve are supplied. These valves V, V are also schematically illustrated in FIG. 1.

What is claimed is:

1. A gauge for observing low-boiling liquefied gases, characterized in a transparent tube through which the liquefied gas flows, a vacuum-tight chamber disposed completely around said tube with respect to the direction of flow of liquefied gas therein, two sight windows in the wall of said chamber for observing the liquefied gas in said tube, said sight windows being disposed opposite to and in line with each other at the level of said tube therebetween, a set of connecting members joining each end of said tube with a respective end wall of said chamber, said tube and connecting means being disposed entirely within said chamber, said tube being made of a glass material, each set of said connecting members comprising a transition means, which comprises a glass pipe, and compensating means for equalizing any longitudinal changes in said tube due to the liquefied gas flowing therethrough, each compensating means being a metal cylinder connected at one end to its said transition means and at the other end to one of said end walls of said chamber, each said pipe being connected at one end to its said metal cylinder and at its other end to said tube, and said tube being in flow communication with said glass pipes and said metal cylinders whereby the liquefied gas may flow through said chamber by flowing through one of said metal cylinders into its glass pipe and through said tube and then exiting through the other of said glass pipes and then out the other of said metal cylinders.

2. In the gauge of claim 1 wherein said wall of said chamber is made of a material different from the material of said windows.

3. In the gauge of claim 1 wherein said vacuum chamber is free of other structural elements between said windows and tube with said tube being in direct line with each window without any structural element therebetween.

4. In the gauge of claim 1 wherein said glass pipe is of multilayer construction and one end thereof is inserted into said transparent tube, and said transparent tube and said connecting members being axially mounted with respect to said chamber.

5. In the gauge of claim 1 including means for heating said chamber to prevent ice formation and to maintain clear visibility therein.

6. In the gauge of claim 5 wherein said heating means are disposed at said windows.

7. In the gauge of claim 1 including means for rinsing said chamber with a dry low boiling gas.

8. In the gauge of claim 1 wherein a pair of valve means are disposed in the wall of said chamber for controlling the pressure therein.

* * * * *